(12) United States Patent
Kumazawa et al.

(10) Patent No.: US 6,248,436 B1
(45) Date of Patent: Jun. 19, 2001

(54) COLOR EXHIBITION STRUCTURE

(75) Inventors: Kinya Kumazawa, Yokosuka; Hiroshi Tabata, Yokohama, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/130,605

(22) Filed: Aug. 7, 1998

Related U.S. Application Data

(62) Division of application No. 08/597,372, filed on Feb. 8, 1996, now abandoned.

(30) Foreign Application Priority Data

Feb. 8, 1995 (JP) ........................................... 8-20467

(51) Int. Cl.$^7$ ................. B32B 5/16; B32B 7/02; D02A 3/02
(52) U.S. Cl. ................. 428/328; 428/212; 428/330; 428/372; 442/362; 442/365
(58) Field of Search ................. 428/36.3, 37, 373, 428/913, 212, 323, 372, 325, 328, 330; 442/361, 362, 365

(56) References Cited

U.S. PATENT DOCUMENTS

| 3,816,117 | 6/1974 | Kaukeinen ........................... 96/1.5 |
| 4,514,459 | 4/1985 | Nakagawa et al. ................. 428/229 |
| 5,407,738 | 4/1995 | Tabata et al. ......................... 428/229 |
| 5,472,798 | * 12/1995 | Kumazawa et al. ................ 428/690 |
| 5,638,198 | * 6/1997 | Crossley et al. .................... 349/104 |
| 5,814,367 | * 9/1998 | Hubbard et al. .................... 427/162 |
| 5,869,929 | * 2/1999 | Eida et al. ........................... 313/501 |

FOREIGN PATENT DOCUMENTS

| 2988 | 1/1953 | (DE) . |
| 26 50 340 A1 | 5/1978 | (DE) . |
| 43 26 521 A1 | 2/1994 | (DE) . |
| 827798 | 5/1938 | (FR) . |
| 536740 | 4/1941 | (GB) . |
| 43-14185 | 6/1943 | (JP) . |
| 53-083497 | 7/1978 | (JP) . |
| 56-144219 | 11/1981 | (JP) . |
| 59-228042 | 12/1984 | (JP) . |
| 59-228052 | 12/1984 | (JP) . |
| 63-64535 | 12/1984 | (JP) . |
| 60-24847 | 6/1985 | (JP) . |
| 62-170510 | 7/1987 | (JP) . |
| 1-139803 | 6/1989 | (JP) . |
| 7-34324 | 2/1995 | (JP) . |

OTHER PUBLICATIONS

The Society of Textile Machinery (Seni Kikai Gakkaisi) Journal, 1989, vol. 42, No. 2, pp. 55–65.
The Society of Textile Machinery (Seni Kikai Gakkaisi) Journal, 1989, vol. 42, No. 10, pp. 60–68 (with English abstract).
Webber, T.G., "Coloring of Plastics", New York, John Wiley & Sons, 1979, pp. 11–12.
Elvers et al., "Ullmann's Encyclopedia of Industrial Chemistry, 5$^{th}$ Edition, vol. A20", Weinheim, VCM–Verlagsgesellschaft, 1992, p. 287.

* cited by examiner

Primary Examiner—Paul Thibodeau
Assistant Examiner—Holly C. Rickman
(74) Attorney, Agent, or Firm—McDermott, Will & Emery

(57) ABSTRACT

A color exhibition structure comprising a number of minute granular substances dispersed in a transparent substance. The materials of the transparent and granular substances are selected in such a manner as to exhibit a visible color produced by reflection and scattering of a light incident on the color exhibition structure. Alternatively, the color exhibition structure may comprise a number of minute granular substances dispersed in at least one of first and second layers laminated alternatively. The materials of the first and second layers and the granular substances are selected in such a manner as to exhibit a visible color produced by reflection, interference and scattering of a light incident on the color exhibit structure.

15 Claims, 7 Drawing Sheets

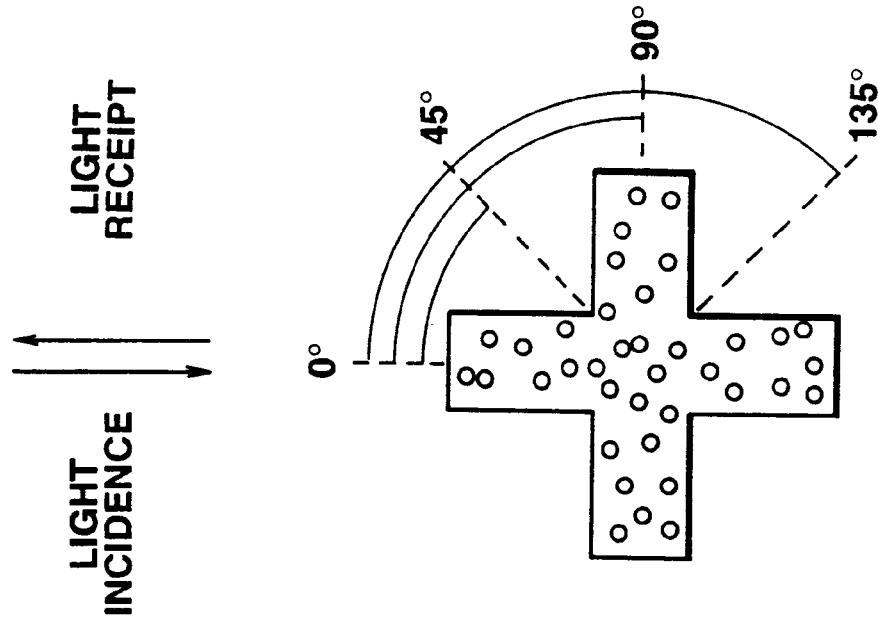
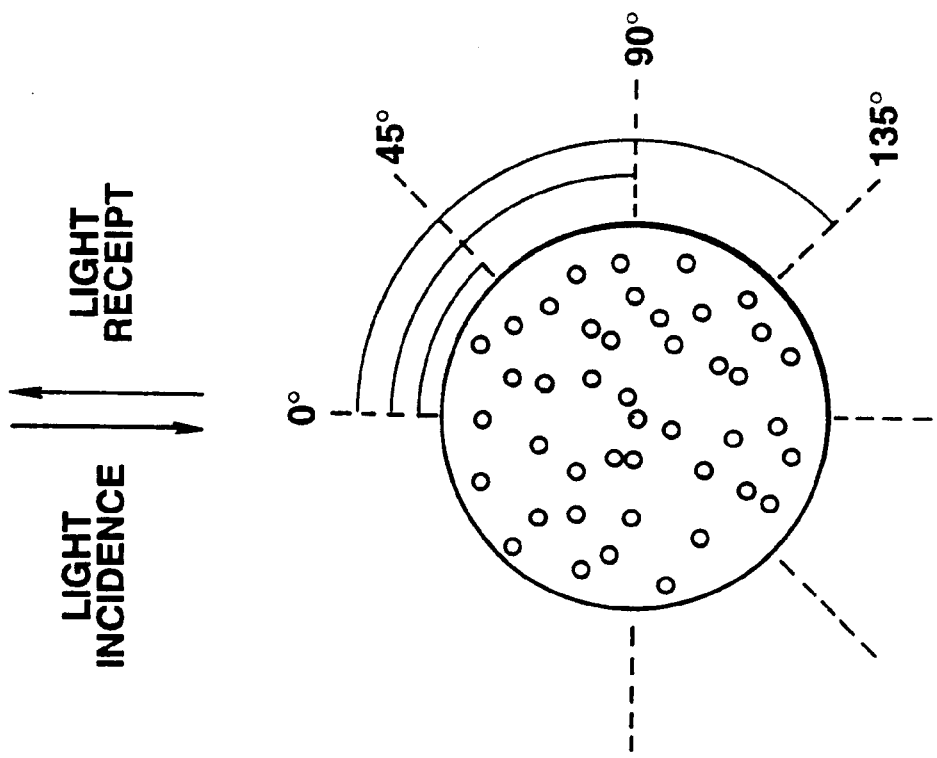

COLOR EXHIBITION STRUCTURE

This application is a divisional of application Ser. No. 08/597,372 filed Feb. 8, 1996 now abandoned.

BACKGROUND OF THE INVENTION

This invention relates to a structure for use in fabrics or paints to exhibit a color produced by reflection, interference and/or scattering of a light incident thereon.

In order to meet recent consumers' needs for multiform and high-grade products, color exhibition structures have been developed which can exhibit colors having a high degree of chroma to provide grace and deluxe appearance. For example, Japanese Patent Kokai No. 1-139803 discloses a covered type complex fiber made of two or more kinds of resin having different refractive indexes to provide a luster like a pearl. The Society of textile machinery (Sen-i Kikai Gakkai) journal, 1989, Vol. 42, No. 2, page 55 and Vol. 42, No. 10, page 160 describes a color exhibition structure having a molecular orientation anisotropic polymer film sandwiched between two polarizing films. However, such color exhibition structures are not practical since they require fine fibers or chips difficult to be produced. Furthermore, it is very difficult to control the reflected dominant wavelength.

Japanese Patent Publication No. 63-64535 (Japanese Patent Kokai No. 59-223337) also discloses a color exhibition structure which exhibits a color produced by interference of a light incident thereon. However, it is very difficult to produce a desired color exhibit structure since no disclosure exists for the detailed specifications such as the shape and thickness of the color exhibition structure and the refractive indexes of the materials of the color exhibition structure.

SUMMARY OF THE INVENTION

It is a main object of the invention to provide an improved color exhibition structure which can exhibit a desired vivid color within a visible light range.

There is provided, in accordance with the invention, a structure for exhibiting a color produced by reflection and scattering of a light incident thereon. The color has a wavelength within a visible light range. The color exhibition structure comprises a transparent substance having a first refractive index, and a number of minute granular substances dispersed in the transparent substance. The granular substances have a second refractive index greater than the first refractive index.

In another aspect of the invention, there is provided a structure for exhibiting a color produced by reflection, interference and scattering of a light incident thereon. The color has a wavelength within a visible light range. The color exhibition structure comprises a plurality of first layers made of a material having a first refractive index, and a plurality of second layers made of a material having a second refractive index different from the first refractive index. The first and second layers are laminated alternatively. The color exhibition structure also includes a number of minute granular substances dispersed in the first and second layers. The granular substances have a third refractive index different from the first and second refractive indexes.

BRIEF DESCRIPTION OF THE DRAWINGS

The invention will be described in greater detail by reference to the following description taken in connection with the accompanying drawings, in which:

FIGS. 5A and 5B are sectional views used in explaining the angular positions at which the reflectance spectrum of the color exhibition structure is measured;

DETAILED DESCRIPTION OF THE INVENTION

Figure 1D:
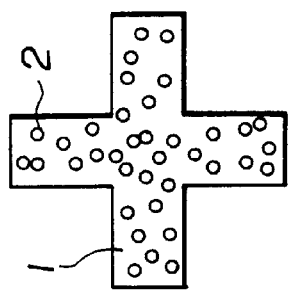
FIGS. 1B to 1H are views similar to FIG. 1A showing various modified forms of the color exhibition structure of the invention.
Figure 1C:
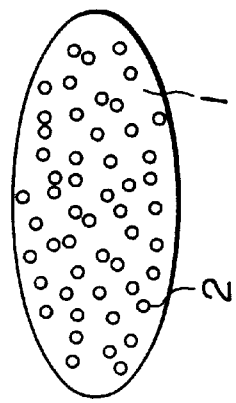
Figure 1B:
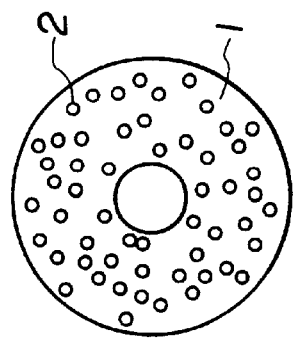
Figure 1A:
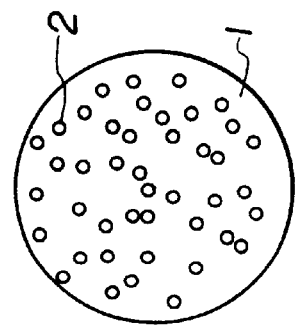
FIG. 1A is a sectional view showing one embodiment of a color exhibition structure made in accordance with the invention.
Figure 1H:
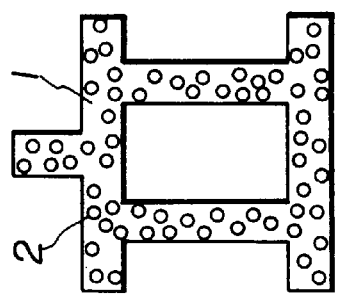
Figure 1G:
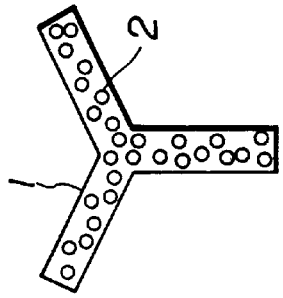
Figure 1F:
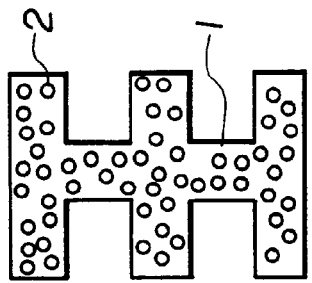
Figure 1E:
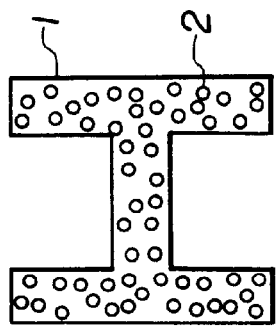

With reference to the drawings and in particular to FIG. 1A, there is shown a color exhibition structure embodying the invention. In the illustrated case, the color exhibition structure is taken in the form of a yarn. The color exhibition structure includes a transparent substance 1 having a circular cross section. The transparent substance 1 has a number of minute granular substances 2 dispersed therein. The cross sectional shape of the transparent substance 1 is not an important factor for the color exhibition structure of the invention. For example, the transparent substance 1 may have an annular cross section, as shown in FIG. 1B or an oval cross section, as shown in FIG. 1C. Alternatively, the transparent substance 1 may have a plus (+) shaped cross section, as shown in FIG. 1D, an H-shaped cross section, as shown in FIG. 1E, or other deformed cross sections, as shown in FIGS. 1F, 1G and 1H.

The transparent substance 1 may be made of a material such as glass, ceramics, a high molecular resin or the like not colored within the visible light range (at wavelengths ranging from 0.38 to 0.78 $\mu$m). It is desirable to permit sufficient transmission of a light incident on the color exhibition structure thereinto by a choice of the material in such a manner that the transparent substance 1 has an average transmission factor equal to or greater than about 80%. The granular substances 2 are made of a material such as glass, ceramics, a high molecular resin or the like which exhibits a refractive index greater than the transparent substance 1, an ease of deformation into minute particles and an ease of dispersion in the transparent substance 1.

It is required for effective color production that the refractive index $n_b$ of the granular substances 2 is greater than the refractive index $n_a$ of the transparent substance 1.

Figure 2:
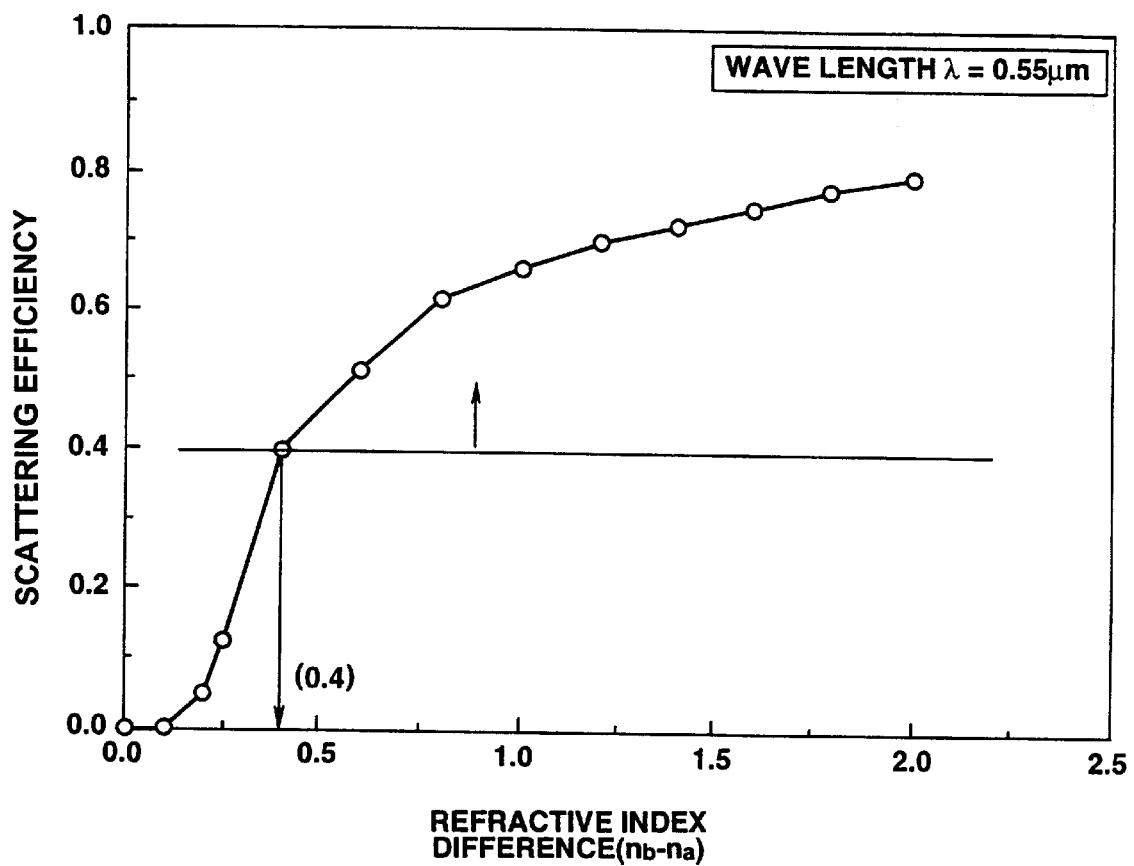
FIG. 2 is a graph showing the scattering efficiency as plotted with respect to the difference between the refractive indexes of the transparent and granular substances.

FIG. 2 shows the relationship of the scattering efficiency with respect to the difference ($n_b-n_a$) between the refractive indexes of the transparent and granular substances 1 and 2 for production of a color (light) having a wavelength of 0.55 μm. If the transparent and granular substances 1 and 2 have the same refractive index ($n_b-n_a=0$), the light incident on the color exhibition structure will not diffuse and the color exhibition structure will exhibit no color. The color exhibition structure can exhibit a color under the condition of $n_b>n_a$. In general, human's color recognition is possible with 0.4 or more scattering efficiency. As can be seen from FIG. 2, the scattering efficiency increases as the refractive index difference increases. The scattering efficiency exceeds 0.4 when the refractive index difference exceeds 0.4. It is desirable, therefore, to produce a vivid color by a choice of the materials of the transparent and granular substances 1 and 2 in such a manner that the difference between the refractive index $n_b$ of the granular substances 2 and the refractive index $n_a$ of the transparent substance 1 is equal to or greater than 0.4.

Figure 3:
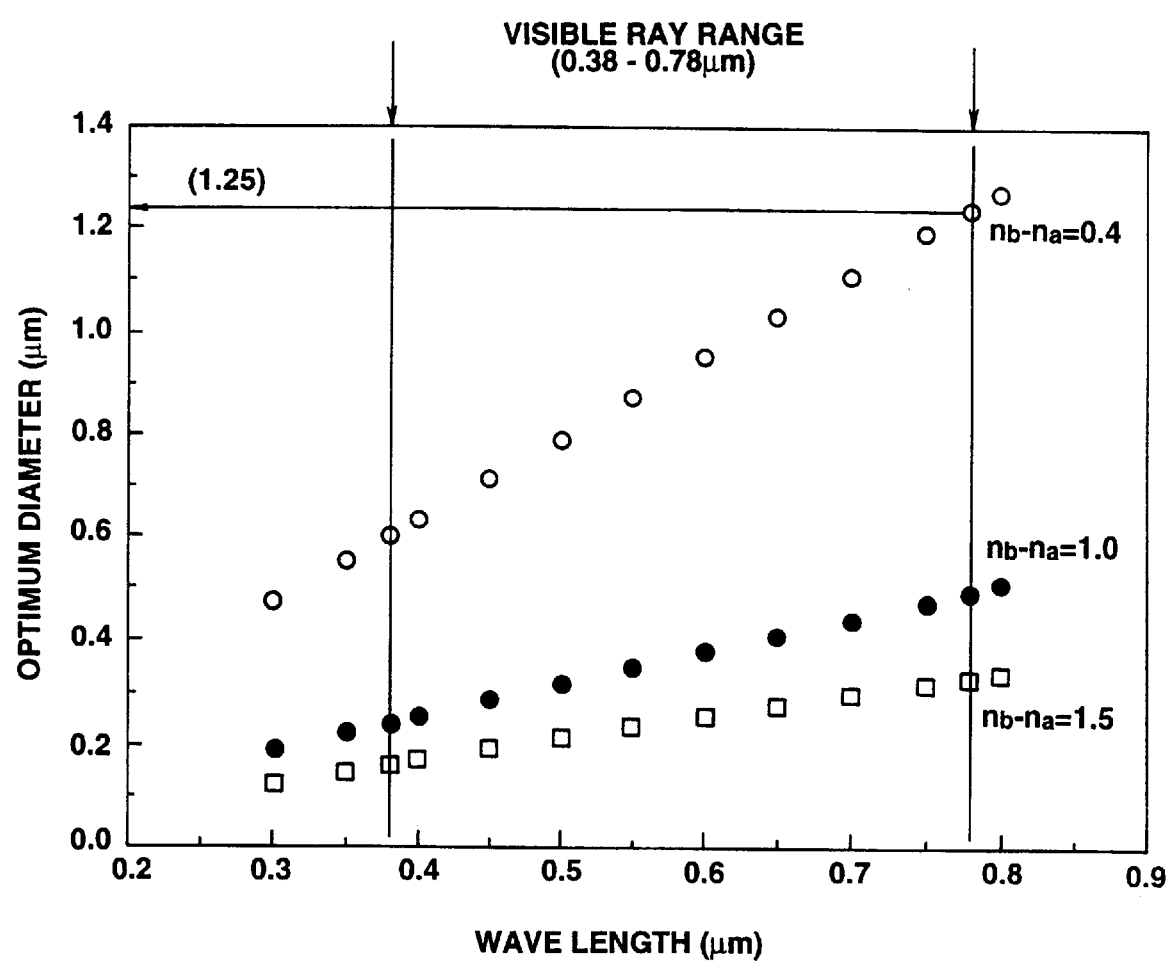
FIG. 3 is a graph plotting the optimum granular substance diameter with respect to the wavelength of the color to be produced for different differences between the refractive indexes of the transparent and granular substances.

FIG. 3 shows the relationship of the optimum granular substance diameter with respect to the wavelength of the color to be produced for different refractive index differences ($n_b-n_a$). As can be seen from FIG. 3, the wavelength of the color to be produced depends on the diameter of the granular substances 2 dispersed in the transparent substance 1. The wavelength at the upper limit of the visible light range is 0.78 μm. Assuming now that the refractive index difference ($n_b-n_a$) is 0.4, the optimum diameter of the granular substances 2 is about 1.25 μm for the color having the maximum wavelength 0.78 μm. To produce colors within the visible light range (at wavelengths ranging from 0.38 to 0.78 μm), thus, the granular substances 2 may have a diameter equal to or less than 1.25 μm. If the granular substance diameter is greater than this range, the reflected and diffused light will be invisible since its wavelength exceeds the near infrared ray range. It can be seen from FIG. 3 that the optimum granular substance diameter decreases with increase in the difference ($n_b-n_a$) between the refractive indexes of the transparent and granular substances 1 and 2. That is, the optimum granular substance diameter depends on the difference between the refractive indexes of the transparent and granular substances 1 and 2. From transparent and granular substance production cost and other considerations, the refractive index difference and granular substance diameter may be selected to produce a desired color.

Figure 4:
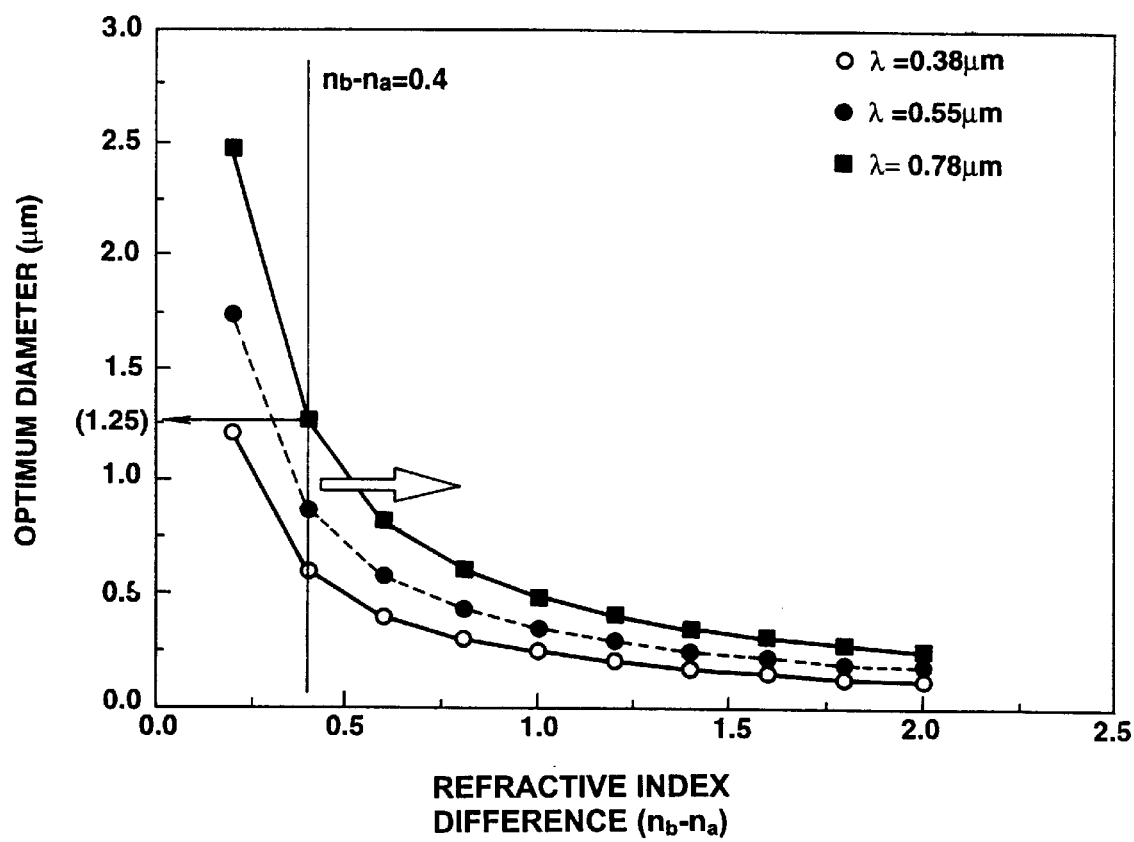
FIG. 4 is a graph plotting the optimum granular substance diameter with respect to the difference between the refractive indexes of the transparent and granular substances for different wavelengths of the color to be produced.

FIG. 4 shows the optical granular substance diameter in relation to the difference ($n_b-n_a$) between the refractive indexes of the transparent and granular substances 1 and 2 for different wavelengths of the color (light) produced from the color exhibition structure. As can be seen from FIG. 4, it is possible to produce a desired color by selecting the refractive index difference ($n_b-n_a$) and the granular substance diameter according to the color to be produced. The refractive index difference ($n_b-n_a$) is set at a value equal to or greater than about 0.4 and the granular substance diameter is set at a value less than about 1.25 μm according to the color to be produced. For example, to produce a color (green) having a wavelength of 0.55 μm, the refractive index difference ($n_b-n_a$) may be set at about 1.0 and the granular substance diameter may be set at about 0.35 μm. The reason why the light can reflect and diffuse to a great extent by such selections of the refractive index difference and granular substance diameter is not fully understood, but it may be considered that a phenomenon like Mie scattering occurs since the granular substances have a diameter substantially equal to the wavelength.

The transparent substance 1 may comprise any material which allows the granular substances 2 to disperse therein with ease and contains limited impurities. A great amount of impurities contained in the transparent substance 1 will absorb light and hinder the color production resulting from the light reflection and scattering effected by the function of the granular substances 2. A desirable material for the transparent substance 1 is a high molecular resin and, more particularly, to a thermoplastic resin. Such materials include, but are in no way limited to, polyester, polyacrylonitrile, polystyrene, nylon, polypropylene, polyvinyl alcohol, polycarbonate, polymethyl methacrylate, polyether ether ketone, polyparaphenylene terephthalite, polyphenylene sulfide and the like. Alternatively, the transparent substance may be made of a copolymer or mixture of at least two of the materials listed above.

The granular substances 2 may comprise any material which can set the refractive index difference ($n_b-n_a$) at 0.4 or more and the granular substance diameter at 1.25 μm or less. From the standpoints of dispersibility, cohesion and thermal stability, a desired material of the granular substances 2 is an inorganic material for use with a transparent substance 1 made of a high molecular resin. Such materials include, but are in no way limited to, calcium carbonate (refractive index: 1.65), zinc sulfate (refractive index: 2.37), zinc white (refractive index: 1.95–2.0), lithophone (refractive index: 1.86–1.96), cadmium sulfate (refractive index: 2.4), chrome oxide (refractive index: 2.5), rutile type titanium dioxide (refractive index: 2.76), anatase type titanium dioxide (refractive index: 2.52), and the like. Titanium dioxide is a preferable material of the granular substances 2 for use with one of the thermoplastic resins listed above in view of its great refractive index and the ease with which it is processed into the form of minute particles and controlled to a desired diameter. Preferably, the granular substances 2 is made of a material having a melting point higher than that of the transparent substance 1 when the material is a high molecular resin similar to the material of transparent material 1.

Although the amount of the granular substances 2 dispersed in the transparent substance 1 depends on the ease with which the granular substances 2 are dispersed in the transparent substance 1 and the proximity interaction of the granular substances 2, it may be set within the range of 0.1 to 10 weight percents. The reason for this percentage has an upper limit would be that an increase in the amount of the granular substances 2 will increase the tendency of the granular substances 2 getting close to each other and the pseudo diameter of the granular substances 2 so as to hinder the scattering of the light incident on the color exhibition structure.

The color exhibition structure of the invention, which is arranged to exhibit a color by the function of reflection and scattering of a light incident thereon, can produce a color regardless of the direction of incidence of a light thereon. Such a color exhibition structure may be used as warp or woof to produce fabrics which can exhibit a vivid color to provide good appearance. With the yarns having deformed cross sections as shown in FIGS. 1D to 1H, it is possible to produce excellent mercerized fabrics.

The peak wavelengths of the color of the color exhibition structure together with the refractive indexes thereof were measured for different angle positions. These tests were conducted for the following examples. Table 1 shows the rest results.

TABLE 1

| ITEMS | | 0° | 45° | 90° | 135° |
|---|---|---|---|---|---|
| EX 1 | PEAK WAVELENGTH (µm) | 0.48 | 0.47 | 0.47 | 0.47 |
| | REFLECTANCE (%) | 65 | 63 | 65 | 62 |
| EX 2 | PEAK WAVELENGTH (µm) | 0.54 | 0.54 | 0.55 | 0.55 |
| | REFLECTANCE (%) | 71 | 69 | 68 | 70 |
| EX 3 | PEAK WAVELENGTH (µm) | 0.53 | 0.55 | 0.54 | 0.54 |
| | REFLECTANCE (%) | 62 | 60 | 63 | 60 |
| EX 4 | PEAK WAVELENGTH (µm) | 0.46 | 0.48 | 0.48 | 0.47 |
| | REFLECTANCE (%) | 61 | 60 | 65 | 61 |
| EX 5 | PEAK WAVELENGTH (µm) | 0.64 | 0.65 | 0.63 | 0.64 |
| | REFLECTANCE (%) | 59 | 56 | 52 | 58 |

EXAMPLE 1

A color exhibition structure which exhibits a vivid blue color having a reflection peak at a wavelength $\lambda=0.48$ µm. The transparent substance 1 was made of polyphenylene sulfide (PPS) having a refractive index of 1.76 and the granular substances 2 was made of rutile type titanium dioxide having a refractive index of 2.76. The difference of the refractive index of the transparent substance 1 from that of the granular substance 2 was 1.0. The titanium dioxide was processed to have a diameter of 0.3 µm and contained in the transparent substance 1 at one percent by weight. The used yarn had a circular cross section as shown in FIG. 1A. The yarn was produced with the use of a 0.5ø circular nozzle hole according to a melt spinning method. That is, the yarn was spun at a temperature of 350° C. The take-up velocity was 500 m/min with the use of a single filament. The yarn was cooled and caked at a room temperature. The obtained yarn had a diameter of about 60 µm.

The reflection spectrum of the color exhibition structure taken in the form of a yarn was estimated with the use of a microspectrophotometer (Hitachi Co., Model U-6000) with the angle of light incidence held at 0° and the angle of light reception held at 0°. This estimation was repeated for different angular positions at angles of 0°, 45°, 90° and 135° of rotation of the color exhibition structure, as shown in FIG. 5A. The standard white board was standardized for the reflectance measurements. A vivid blue color was exhibited at all of the angular positions with substantially no change found in the reflection peak (0.48 µm) and reflectance regardless of the light incidence angle.

EXAMPLE 2

A color exhibition structure which exhibits a vivid green color having a reflection peak at a wavelength $\lambda=0.55$ µm.

The transparent substance 1 was made of polyethylene terephthalate (PET) having a refractive index of 1.55 and the granular substances 2 was made of anatase type titanium dioxide having a refractive index of 2.52. The difference of the refractive index of the transparent substance 1 from that of the granular substance 2 was 1.0. The titanium dioxide was processed to have a diameter of 0.35 µm and contained in the transparent substance 1 at two percents by weight. The used yarn had a circular cross section, as shown in FIG. 1A. The yarn was produced with the use of a 0.5ø circular nozzle hole according to a melt spinning method. That is, the yarn was spun at a temperature of 285° C. The take-up velocity was 1000 m/min with the use of a single filament. The yarn was cooled and caked at a room temperature. The obtained yarn had a diameter of about 40 µm.

The reflection spectrum of the color exhibition structure taken in the form of a yarn was estimated with the use of a microspectrophotometer (Hitachi Co., Model U-6000) with the angle of light incidence held at 0° and the angle of light reception held at 0°. This estimation was repeated for different angular positions at angles of 0°, 45°, 90° and 135° of rotation of the color exhibition structure, as shown in FIG. 5A. The standard white board was standardized for the reflectance measurements. A valid green color was produced at all of the angular positions with substantially no change found in the reflection peak (0.55 µm) and reflectance regardless of the light incidence angle.

EXAMPLE 3

A color exhibition structure which exhibits a vivid green color having a reflection peak at a wavelength $\lambda=0.55$ µm. The transparent substance 1 was made of polypropylene (PP) having a refractive index of 1.5 and the granular substances 2 was made of zinc white having a refractive index of 2.0. The difference of the refractive index of the transparent substance 1 from that of the granular substance 2 was 1.0. The zinc white was processed to have a diameter of 0.88 µm and contained in the transparent substance 1 at 0.5 percents by weight. The used yarn had a circular cross section, as shown in FIG. 1A. The yarn was produced with the use of a 0.8ø circular nozzle hole according to a melt spinning method. That is, the yarn was spun at a temperature of 240° C. The take-up velocity was 500 m/min with the use of a single filament. The yarn was cooled and caked at a room temperature. The obtained yarn had a diameter of about 80 µm.

The reflection spectrum of the color exhibition structure taken in the form of a yarn was estimated with the use of a microspectrophotometer (Hitachi Co., Model U-6000) with the angle of light incidence held at 0° and the angle of light reception at 0°. This estimation was repeated for different angular positions at angles of 0°, 45°, 90° and 135° of rotation of the color exhibition structure, as shown in FIG. 5A. The standard white board was standardized for the reflectance measurements. A vivid green color was produced in all of the angular positions with substantially no change found in the reflection peak (0.55 µm) and reflectance regardless of the light incidence angle.

EXAMPLE 4

A color exhibition structure which exhibits a vivid blue color having a reflection peak at a wavelength $\lambda=0.48$ µm. The transparent substance 1 was made of polyethylene terephthalate (PET) having a refractive index of 1.55 and the granular substances 2 was made of anatase type titanium dioxide having a refractive index of 2.52. The difference of the refractive index of the transparent substance 1 from that of the granular substance 2 was 1.0. The titanium dioxide was processed to have a diameter of 0.3 µm and contained in the transparent substance 1 at two percents by weight. The used yarn had a deformed cross section, as shown in FIG. 1D. The yarn was produced with the use of a plus (+) shaped nozzle hole according to a melt spinning method. That is, the yarn was spun at a temperature of 285° C. The take-up velocity was 500 m/min with the use of a single filament. The yarn was cooled and caked at a room temperature. The obtained yarn had a diameter of about 10 µm.

The reflection spectrum of the color exhibition structure taken in the form of a yarn was estimated with the use of a microspectrophotometer (Hitachi Co., Model U-6000) with the angle of light incidence held at 0° and the angle of light reception held at 0°. This estimation was repeated for different angular positions at angles of 0°, 45°, 90° and 135° of rotation of the color exhibition structure, as shown in FIG. 5B. The standard white board was standardized for the reflectance measurements. A vivid blue color was produced in all of the angular positions with almost no change found in the reflection peak (0.48 μm) and reflectance regardless of the light incidence angle.

EXAMPLE 5

A color exhibition structure which exhibits a vivid red color having a reflection peak at a wavelength λ=0.65 μm. The transparent substance 1 was made of polypropylene (PP) having a refractive index of 1.5 and the granular substances 2 was made of chrome oxide having a refractive index of 2.5. The difference of the refractive index of the transparent substance 1 from that of the granular substance 2 was 1.0. The chrome oxide was processed to have a diameter of 0.42 μm and contained in the transparent substance 1 at five percents by weight. The used yarn had an oval cross section as shown in FIG. 1C. The yarn was produced with the use of 0.5⌀ flat nozzle hole (having an apse line of 1.0 mm and a minor axis of 0.5 mm) according to a melt spinning method. That is, the yarn was spun at a temperature of 210° C. The take-up velocity was 1000 m/min with the use of a single filament. The yarn was cooled and caked at a room temperature. The obtained yarn had a diameter of about 100 μm.

The reflection spectrum of the color exhibition structure taken in the form of a yarn was estimated with the use of a microspectrophotometer (Hitachi Co., Model U-6000) with the angle of light incidence held at 0° and the angle of light reception held at 0°. This estimation was repeated for different positions at angles of 0°, 45°, 90° and 135° of rotation of the color exhibition structure, as shown in FIG. 5A. The standard white board was standardized for the reflectance measurements. A vivid red color was produced at all of the all of the angular positions with substantially no change found in the reflection peak (0.65 μm) and reflectance regardless of the light incidence angle.

EXAMPLE 6

A color exhibition structure which exhibits a vivid blue color having a reflection peak at a wavelength λ=0.65 μm. The transparent substance 1 was made of polyvinylidene fluoride (PVDF) having a refractive index of 1.4 and the granular substances 2 was made of polyphenylene sulfide (PPS) having a refractive index of 1.8. The difference of the refractive index of the transparent substance 1 from that of the granular substance 2 was 0.4. The polyphenylene sulfide was processed to have a diameter of 0.88 μm and contained in the transparent substance 1 at five percent by weight. The used yarn had a circular cross section, as shown in FIG. 1A. The yarn was produced with the use of a 0.8⌀ circular nozzle hole according to a melt spinning method. That is, the yarn was spun at a temperature of 290° C. The take-up velocity was 500 m/min with the use of a single filament. The yarn was cooled and caked at a room temperature. The obtained yarn had a diameter of about 80 μm.

The reflection spectrum of the color exhibition structure taken in the form of a yarn was estimated with the use of a microspectrophotometer (Hitachi Co., Model U-6000) with the angle of light incidence held at 0° and the angle of light reception held at 0°. This estimation was repeated for different positions at angles of 0°, 45°, 90° and 135° of rotation of the color exhibition structure, as shown in FIG. 5A. The standard white board was standardized for the reflectance measurements. A vivid green color was produced in all of the angular positions with substantially no change found in the reflection peak (0.55 μm) and reflectance regardless of the light incidence angle.

Referring to FIG. 6, there is shown a second embodiment of the color exhibition structure of the invention. The color exhibition structure is shown in the form of a yarn and it includes first and second layers 10 and 20 laminated alternatively in the direction (y) in which a natural light is incident on the color exhibition structure. The first and second layers 10 and 20 are shown as having certain thicknesses ($d_a$, $d_b$) and a certain length extending in the direction (x) perpendicular to the direction (y). The first and second layers 10 and 20 are made of different kinds of material for producing a visible color by reflection and interference of a light incident thereon. The first layer 10 has a refractive index $n_a$ and the second layer 20 has a refractive index $n_b$. These refractive indexes are selected to fulfill the conditions of $1.3 \leq n_a$, $1.1 \leq n_b/n_a \leq 1.4$.

The desirable materials of the first and second layers 10 and 20 are high molecular resins and, more particularly, thermoplastic resins having a certain degree of visible light transmission. Such materials include, but are in no way limited to, polyester, polyacrylonitrile, polystyrene, nylon, polypropylene, polyvinyl alcohol, polycarbonate, polymethyl methacrylate, polyether ether ketone, polyparaphenylene terephthalate, polyphenylene sulfide and the like. Alternatively, the first and second layers 10 and 20 may be made of a copolymer or mixture of at least two of the materials listed above.

A number of minute granular substances 2 are dispersed in at least one of the first and second layers 10 and 20. In the illustrated case, the granular substances 2, which are indicated as black points, are dispersed in both of the first and second layers 10 and 20. The granular substances 2 have a refractive index different from the reflective indexes of the first and second layers 10 and 20. In view of production of a vivid color, it is required to select the refractive index and diameter of the granular substances 2 in such a manner as to produce the same color as the laminated structure of the first and second layers. Because of the light scattering resulting from the dispersion of the granular substances 2, the degree of influence of the light indigence angle on the color exhibition is reduced to a great extent. It is, therefore, not required to direct the light incident on the color exhibition structure in the direction where the first and second layers are laminated.

Figure 6A:
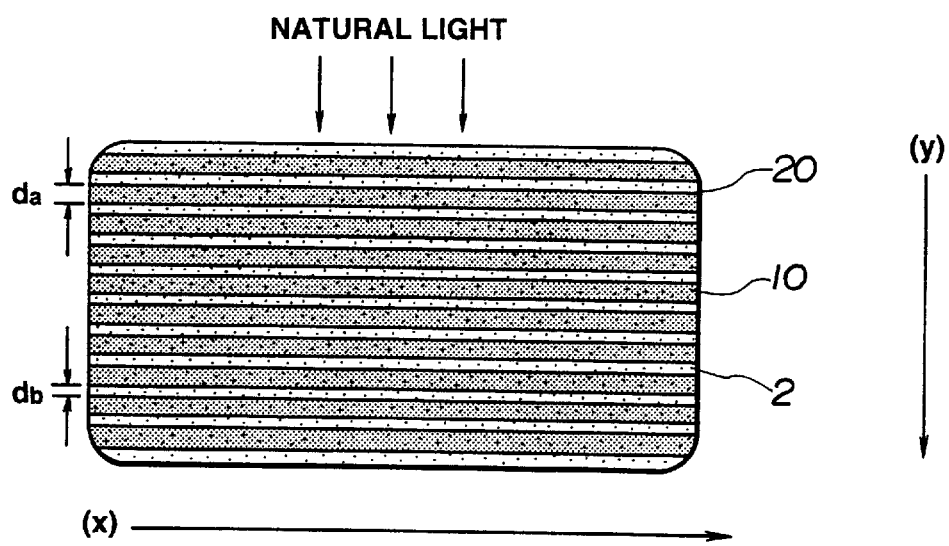
FIG. 6A is a sectional view showing a second embodiment of the color exhibition structure of the invention.
Figure 6B:
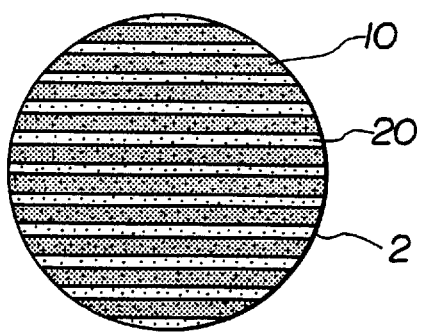
FIGS. 6B and 6C are views similar to FIG. 6A showing modified forms of the color exhibition structure of the invention.
Figure 6C:
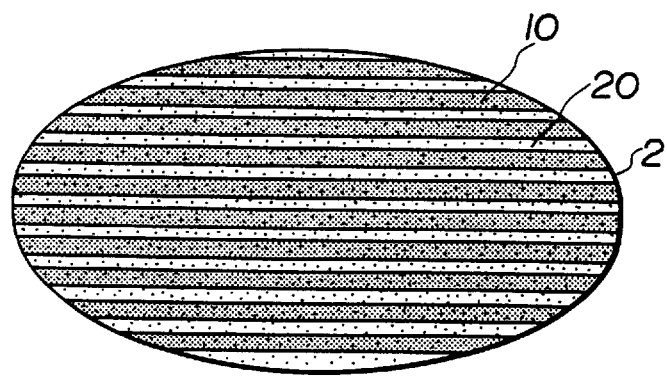

The cross sectional shape of the color exhibition structure (yarn) is not an important factor. For example, the color exhibition structure may have a rectangular cross section, as shown in FIG. 6A, a circular cross section, as shown in FIG. 6B, or an oval cross section, as shown in FIG. 6C.

A flat-shaped color exhibition structure having ten laminated layers 10 and 20 was prepared. The first layer 10 was made of polypropylene having a refractive index n=1.5. The second layer 20 was made of polyethylene terephtahalide having a refractive index n=1.68. The prepared color exhibition structure exhibited a blue color having a reflection peak at a wavelength of 0.48 μm. Five percents by weight of granular substances 2 were dispersed in both of the first and second layers 10 and 20. The granular substances 2 were made of anatase type titanium dioxide having a refractive index n=2.76. The granular substances 2 had a diameter of 0.3 μm. About 20% increase was proven in the reflectance of the obtained color exhibition structure (yarn) as compared to the structure containing no granular substances 2. It was also proven that the influence of the light incidence angle on the effect of color exhibition of the obtained color exhibition structure decreased to a great extent as compared to the structure containing no granular substances 2.

Figure 7A:
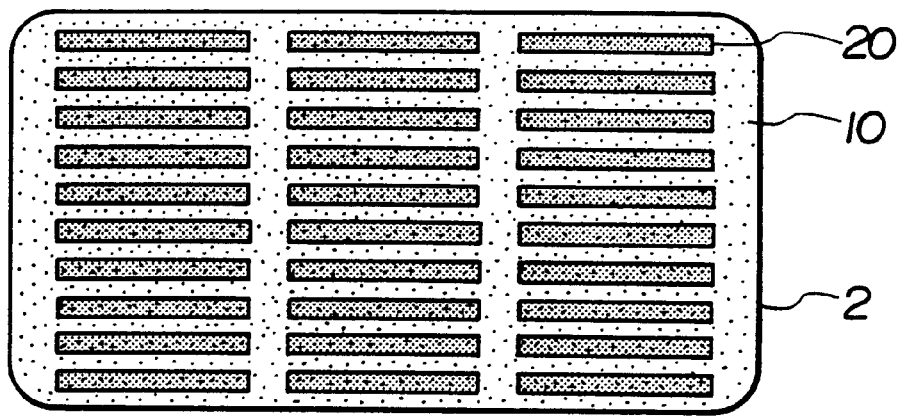
FIG. 7A is a sectional view showing another modified form of the color exhibition structure of the invention.
Figure 7B:
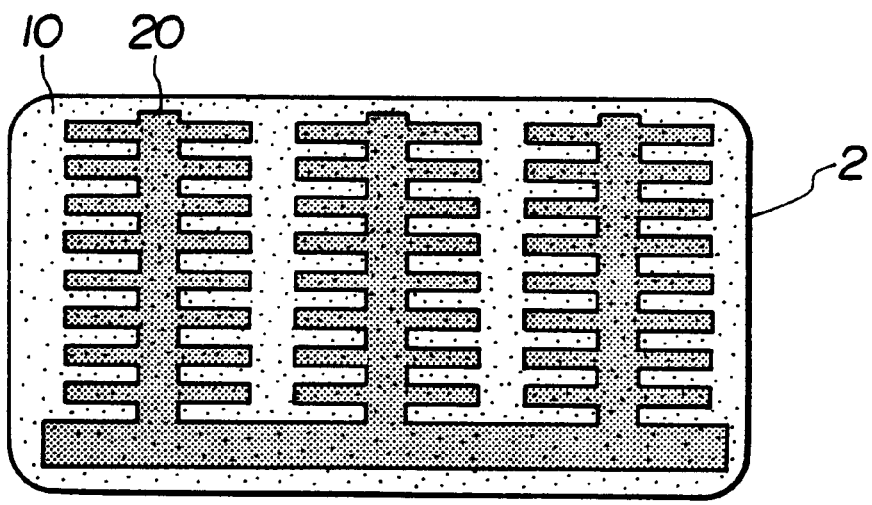
FIG. 7B is a view similar to FIG. 7A showing still another modified form of the color exhibition structure of the invention.

Referring to FIG. 7A, there is shown a modified form of the color exhibition structure of the second embodiment. This modification is substantially the same as the color exhibition structure of FIG. 6A except that each of the second layers 20 is separated into a plurality of (in the illustrated case three) pieces. Preferably, each of the pieces has a length equal to or greater than the wavelength λ (μm) of the reflected light. The pieces of the second layers 20 may be connected, as shown in FIG. 7B.

The above described color exhibition structure provides the following development advantages: First, it exhibits a vivid color regardless of the angle of incidence thereon. Second, it is available for various applications because of the ease with which it is produced according to the current melt spinning method and the ease with which it is processed into a thin fiber or chip form.

What is claimed is:

1. A color exhibition structure in the form of a yarn, filament or chip exhibiting a color produced by reflection and scattering of incident light, the color having a wavelength within the visible light range, the structure comprising:
   a plurality of first transparent layers having a first refractive index $n_1$ equal to or greater than 1.3;
   a plurality of second transparent layers having a second refractive index $n_2$ wherein $1.1 \leq n_2/n_1 \leq 1.4$, the first and second transparent layers being laminated in alternate fashion; and
   minute granules dispersed in at least one of the first and second transparent layers, the granules having a third refractive index $n_3$ wherein $n_3-n_1 \geq 0.4$ and $n_3-n_2 \geq 0.4$, the granules having a size equal to or less than 1.25 μm,
   wherein the granules are made of at least one material selected from the group consisting of calcium carbonate, zinc sulfate, zinc white, lithopone, cadmium sulfate, chrome oxide, rutile and anatase.

2. A color exhibition structure in the form of a yarn, filament or chip exhibiting a color produced by reflection and scattering of incident light, the color having a wavelength within the visible light range, the structure comprising:
   a plurality of first transparent layers having a first refractive index $n_1$ equal to or greater than 1.3;
   a plurality of second transparent layers having a second refractive index $n_2$ wherein $1.1 \leq n_2/n_1 \leq 1.4$, the first and second transparent layers being laminated in alternate fashion; and
   minute granules dispersed in at least one of the first and second transparent layers, the granules having a third refractive index $n_3$ wherein $n_3-n_1 \geq 0.4$ and $n_3-n_2 \geq 0.4$, the granules having a diameter equal to or less than 1.25 μm,
   wherein the granules are made of at least one material selected from the group consisting of calcium carbonate, zinc sulfate, zinc white, lithopone, cadmium sulfate, chrome oxide, rutile and anatase.

3. The color exhibition structure as claimed in claim 2, wherein the transparent layers comprise a material selected from the group consisting of polyester, polyacrylonitile, polystyrene, nylon, polypropylene, polyvinyl alcohol, polycarbonate, polymethyl methacrylate, polyether ether ketone, polyparaphenylene terephthalate and polyphenylene sulfide, and a copolymer or mixture of at least two of the above.

4. The color exhibition structure as claimed in claim 2, wherein the granules have a diameter corresponding to the wavelength of the color produced.

5. The color exhibition structure as claimed in claim 2, wherein the granules are made of rutile.

6. A color exhibition structure in the form of a yarn, filament or chip exhibiting a color produced by reflection and scattering of incident light, the color having a wavelength within the visible range, the structure comprising (1) at least two first elements comprising a transparent substance, (2) a second element made of a transparent substance, the at least two first elements being connected together by the second element and spaced with an air gap, the transparent substances having a first refractive index $n_1$, and (3) minute granules dispersed in the transparent substances, the granules having a diameter equal to or less than 1.25 μm, the granules having a third refractive index $n_3$, wherein $n_3-n_1 \geq 0.4$,
   wherein the granules are made of at least one material selected from the group consisting of calcium carbonate, zinc sulfate, zinc white, lithopone, cadmium sulfate, chrome oxide, rutile, and anatase.

7. The color exhibition structure as claimed in claim 6, wherein the transparent substances are selected from the group consisting of polyester, polyacrylonitrile, polystyrene, nylon, polypropylene, poylyvinyl alcohol, polycarbonate, polymethyl methacrylate, polyether ether ketone, polyparapheneylene terephthalate, polyphenylene sulfide, and copolymers and mixtures of at least two of these.

8. A color exhibition structure in the form of a yarn, filament or chip for exhibiting a color produced by reflection, interference, and scattering of incident light, the color having a wavelength within the visible range, the structure comprising:
   a plurality of first layers of a material having a first refractive index $n_1$;
   a plurality of second layers of a material having a second refractive index $n_2$;
   the first and second layers being alternatively laminated; and
   granules having a diameter of 1.25 μm or less dispersed in at least one of the first and second layers, the granules having a third refractive index $n_3$ satisfying a condition of $n_3-n_1 \geq 0.4$ and $n_3-n_2 \geq 0.4$,
   wherein the granules are made of at least one material selected from the group consisting of calcium carbonate, zinc sulfate, zinc white, lithopone, cadmium sulfate, chrome oxide, rutile and anatase.

9. The color exhibition structure as claimed in claim 8, wherein the first layers are made of a material selected from the group consisting of polyester, polyacrylonitrile, polystyrene, nylon, polypropylene, poylyvinyl alcohol, polycarbonate, polymethyl methacrylate, polyether ether ketone, polyparapheneylene terephthalate, polyphenylene sulfide, and copolymers and mixtures of at least two of these, and the second layers are made of a material selected from the group consisting of polyester, polyacrylonitrile, polystyrene, nylon, polypropylene, poylyvinyl alcohol, polycarbonate, polymethyl methacrylate, polyether ether ketone, polyparapheneylene terephthalate, polyphenylene sulfide, and copolymers and mixtures of at least two of these.

10. The color exhibition structure as claimed in claim 8, wherein the second layers are made of a material selected from the group consisting of polyester, polyacrylonitrile, polystyrene, nylon, polypropylene, poylyvinyl alcohol, polycarbonate, polymethyl methacrylate, polyether ether ketone, polyparaphenylene terephthalate, polyphenylene sulfide, and copolymers and mixtures of at least two of these.

11. The color exhibition structure as claimed in claim 8, wherein the granules have a diameter corresponding to the wavelength of the color produced.

12. The color exhibition structure as claimed in claim 8, wherein the granules are made of anatase.

13. A color exhibition structure as claimed in claim 8, which is in the form of yarn having a diameter of from about 10 $\mu$m to about 100 $\mu$m.

14. A color exhibition structure in the form of a yarn, filament or chip for exhibiting a color produced by reflection, interference, and scattering of incident light, the color having a wavelength within the visible range, the structure comprising:

a plurality of first layers of a material having a first refractive index $n_1$;

a plurality of second layers of a material having a second refractive index $n_2$;

the first and second layers being laminated alternately; and granules having a size of 1.25 $\mu$m or less dispersed in at least one of the first and second layers, the granules having a third refractive index $n_3$ satisfying a color generating refractive index differential condition of $n_3-n_1 24\ 0.4$ and $n_3-n_2 \geqq 0.4$, wherein the granules are made of at least one material selected from the group consisting of calcium carbonate, zinc sulfate, zinc white, lithopone, cadmium sulfate, chrome oxide, rutile and anatase.

15. A color exhibition structure comprising:

a first color generating means comprising first and second layers which produce a first color by interference and reflection of light passing through the first and second layers, the first layer being made of a material having a first refractive index $n_1$, the second layer being made of a material having a second refractive index $n_2$; and a second color generating means comprising granules which are dispersed in at least one of the first and second layers, said granules having a width of 1.25 $\mu$m or less dispersed in at least one of the first and second layers, the granules having a third refractive index $n_3$ satisfying a color generating refractive index differential condition of $n_3-n_1 \geqq 0.4$ and $n_3-n_2 \geqq 0.4$, wherein the granules are made of at least one material selected from the group consisting of calcium carbonate, zinc sulfate, zinc white, lithopone, cadmium sulfate, chrome oxide, rutile and anatase.

* * * * *